United States Patent
Nampo

(10) Patent No.: US 11,119,715 B2
(45) Date of Patent: Sep. 14, 2021

(54) PRINTING APPARATUS

(71) Applicant: BROTHER KOGYO KABUSHIKI KAISHA, Nagoya (JP)

(72) Inventor: Hiromichi Nampo, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 16/810,580

(22) Filed: Mar. 5, 2020

(65) Prior Publication Data

US 2020/0310729 A1    Oct. 1, 2020

(30) Foreign Application Priority Data

Mar. 27, 2019   (JP) .............................. JP2019-060950

(51) Int. Cl.
*G06F 3/12*   (2006.01)

(52) U.S. Cl.
CPC .......... *G06F 3/1292* (2013.01); *G06F 3/1206* (2013.01); *G06F 3/1236* (2013.01)

(58) Field of Classification Search
CPC .... G06F 3/1292; G06F 3/1206; G06F 3/1236; G06F 3/1237
See application file for complete search history.

(56) References Cited

U.S. PATENT DOCUMENTS

| | | | |
|---|---|---|---|
| 2015/0092231 A1* | 4/2015 | Shibata | H04W 76/19 358/1.15 |
| 2016/0128119 A1* | 5/2016 | Maheshwari | H04W 4/80 370/329 |
| 2017/0255423 A1* | 9/2017 | Yoshida | H04L 9/0897 |
| 2018/0034707 A1* | 2/2018 | Aoki | H04W 48/20 |
| 2018/0165555 A1* | 6/2018 | Okuhara | G06K 15/1886 |

FOREIGN PATENT DOCUMENTS

| | | |
|---|---|---|
| JP | 2017-73015 A | 4/2017 |
| JP | 2018-55307 A | 4/2018 |

\* cited by examiner

*Primary Examiner* — Moustapha Diaby
(74) *Attorney, Agent, or Firm* — Kenealy Vaidya LLP

(57) ABSTRACT

There is provided a printing apparatus including: a conveyor configured to convey a print medium; a printing unit configured to perform printing with respect to the print medium; a communication unit configured to perform mutually recognizable wireless communication; and a controller. The controller is configured to execute: detecting the number of an external apparatus which is in a paring state of communicating or of standing by to communicate, with the printing apparatus, via the communication unit and by the mutually recognizable wireless communication, and controlling of the conveyor and the printing unit so as to print, on the print medium, an image of which number corresponds to the detected number of the external apparatus.

9 Claims, 4 Drawing Sheets

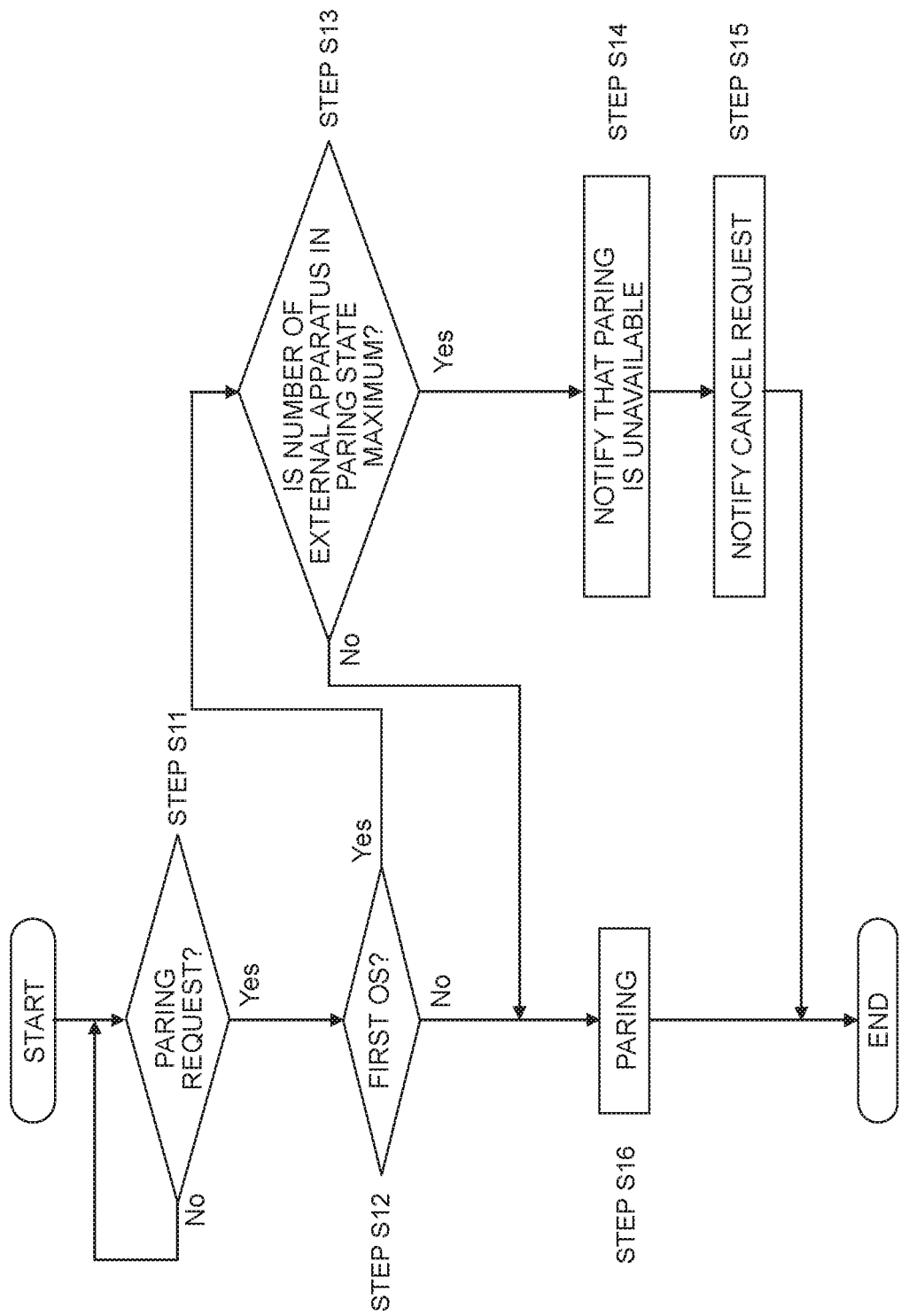

PRINTING APPARATUS

CROSS REFERENCE TO RELATED APPLICATION

The present application claims priority from Japanese Patent Application No. 2019-060950 filed on Mar. 27, 2019, the disclosure of which is incorporated herein by reference in its entirety.

BACKGROUND

Field of the Invention

The present disclosure relates to a printing apparatus which is connected to an external device or apparatus by a mutually recognizable wireless communication.

Description of the Related Art

Conventionally, there is a demand for realizing a reduced labor for a user in the formation of a printed matter based on an editing operation while the user is out of his/her workplace, home, etc. in view of this demand, there is proposed a technique of realizing editing for preparing a printed matter by operating, with a portable terminal (mobile terminal), a printing apparatus placed or installed in a specific place or location.

A publicly known portable terminal is provided with: a storing means for storing print data corresponding to a result of the editing; a wireless communication unit; and a positional information obtaining means for obtaining absolute positional information, of the portable terminal, which is determined by the positional relationship between the portable terminal and a reference item. In a case that the portable terminal reaches a position within a range which is separate and away from the specific location by a predetermined distance, the portable terminal transmits the print data stored in the storing means, via the wireless communication part, with respect to the printing apparatus placed in the specific location. The publicly known portable terminal as described above is configured to execute the printing in such a manner.

The publicly known printing apparatus placed in the specific location as described above, however, executes the printing with respect to print data from one piece of the portable terminal which reaches the location within the range separate and away from the specific location by the predetermined distance. Therefore, the publicly known printing apparatus is not presumed to process print data from a plurality of pieces of the portable terminal.

An aspect of usage, wherein the printing is executed by directly receiving print data from portable terminals such as smartphones, tablet terminals, etc. (hereinafter each referred to as an "external apparatus"), becomes to be more common accompanying with the enhanced performance and the development of communication technology. With respect to such a situation, the measurements therefor from the side of the printing apparatus becomes to be less sufficient.

For example, even in a case that the user newly issues a connection request so as to connect his/her own external apparatus to the printing apparatus, if one or more other external apparatus(es) have been already connected to (are currently communicating with or are being stand-by to communicate with) the printing apparatus, any additional connection is not possible in some cases, depending on the number of the external apparatus(es) connected to the printing apparatus. Accordingly, in a case that the user is allowed to know the number of the external apparatus(es) already connected (including that or those standing by to be connected to) the printing apparatus by any way, the convenience for the user can be improved. In such a case that any additional connection is not possible, any other measure (attempt, approach) including, for example, connecting after some time interval, using another printing apparatus, etc., would be possible to the user.

An object of the present disclosure is to provide a printing apparatus with which it is possible to know the number of external apparatus(es) in paring with the printing apparatus.

SUMMARY

According to an aspect of the present disclosure, there is provided a printing apparatus including: a conveyor configured to convey a print medium; a printing unit configured to perform printing with respect to the print medium; a communication unit configured to perform mutually recognizable wireless communication; and a controller. The controller is configured to execute: detecting of the number of an external apparatus which is in a paring state of communicating, or of standing by to communicate, with the printing apparatus via the communication unit and by the mutually recognizable wireless communication; and controlling of the conveyor and the printing unit so as to print, on the print medium, an image of which number corresponds to the detected number of the external apparatus.

The printing apparatus of the present disclosure is communicable with the external apparatus via the communication unit and by the mutually recognizable wireless communication. For example, in a case that print data from the external apparatus is received by the communication unit, printing corresponding to the print data is formed, by the printing unit, with respect to a print medium conveyed by the conveyor.

The printing apparatus is configured, in some cases, such that the printing apparatus is communicable with a plurality of external apparatuses in the mutually recognizable wireless communication via the communication unit. In such a situation, in some cases, there is a restriction in the number of external apparatus Which can be paired (in the paring state) with the printing apparatus at a time, depending on the kind of the operating system of the external apparatus(es). For example, even if the user attempts to newly pair his/her own external apparatus with the printing apparatus, it is not possible to establish the paring in a case that the number of the external apparatus(es) already paired with the printing apparatus at this point of time has reached the upper limit value. Accordingly, it is convenient for the user if there were any way for the user to know the number of the external apparatus(es) already paired with the printing apparatus.

In view of the above-described situation, in the present disclosure, the controller detects the number of the external apparatus which is in the paring state of communicating (or of standing by to communicate) with the printing apparatus by the mutually recognizable wireless communication. Afterwards, an image is formed. In this situation, the conveyor and the printing unit are controlled to thereby form, on the print medium, the image corresponding to the detected number of the external apparatus as described above.

With this, by counting the number of the image formed on the print medium, the user can know the number of the external apparatus paired with the printing apparatus. As a result, it is possible to improve the convenience for the user.

BRIEF DESCRIPTION OF THE DRAWINGS

FIGS. 1A and 1B are each a view explaining an example of an aspect of usage to which a printing apparatus of an embodiment of the present disclosure is applied, wherein FIG. 1A is a view explaining the aspect of usage, and FIG. 1B is a view explaining an example of a result of printing.

FIG. 4 is a flow chart of a paring controlling routine executed by the controller of the printing apparatus.

DESCRIPTION OF THE EMBODIMENTS

<System Configuration>

Figure 1A:
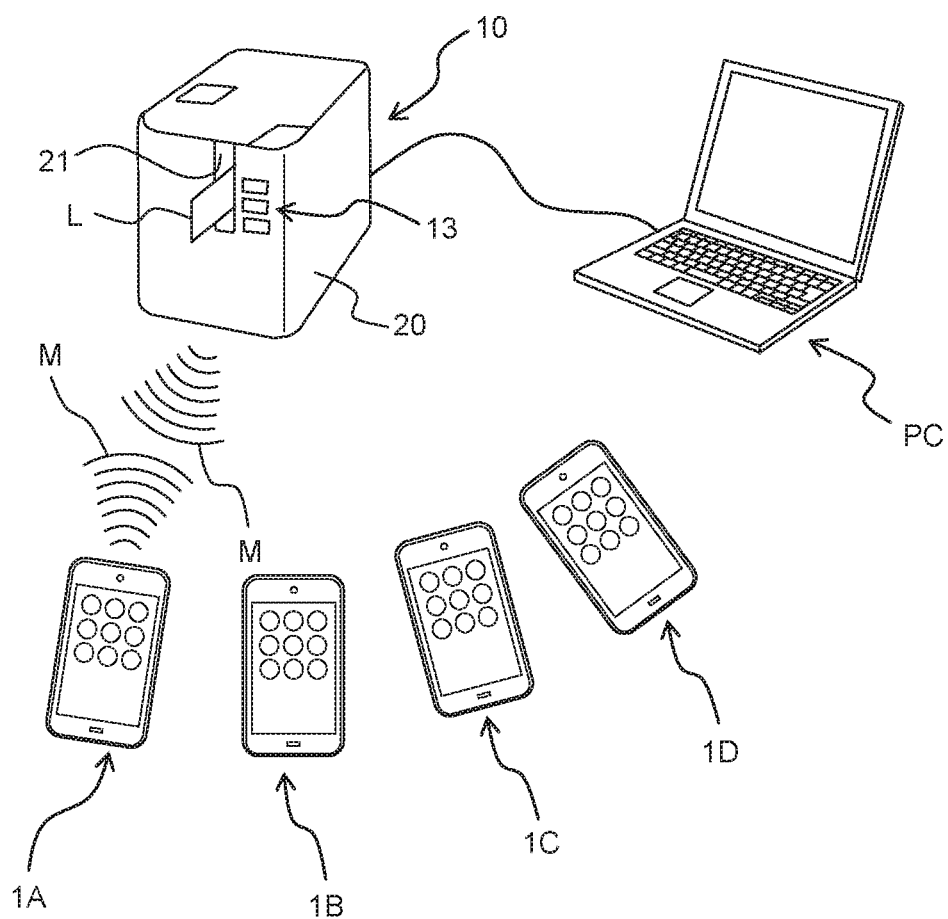
Figure 1B:
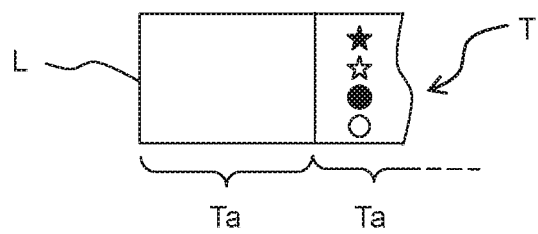

An example of an aspect of usage of a printing apparatus 10 will be explained by using FIGS. 1A and 1B. In FIG. 1A, the printing apparatus 10 is, for example, a label printer which is connected to a personal computer PC via a wire or wirelessly (via Wi-Fi, etc.), and which is configured to prepare a print label L as a printed matter.

The printing apparatus 10 is capable of being connected to a plurality of external apparatuses (smartphones in the drawing) 1A to 1D at a time via, for example, a mutually recognizable wireless communication M, in addition to the above-described personal computer PC. Note that in the following explanation, the external apparatuses 1A to 1D are collectively referred to as "external apparatus 1".

The mutually recognizable wireless communication M is a function previously equipped in each of the printing apparatus 10 and the external apparatus 1, and uses, for example, Basic Rate (BR) or Enhanced Data Rate (EDR) of Bluetooth (trade name).

Basic Rate (BR) or Enhanced Data Rate (EDR) of Bluetooth (trade name) is a wireless communication which is mutually recognizable among apparatuses equipped therewith and present within a radius of approximately 10 m to 100 m, and in which a 2.4-GHz band is divided into seventy nine (79) frequency channels while performing a frequency hopping of randomly changing the frequency to be utilized.

Figure 2:
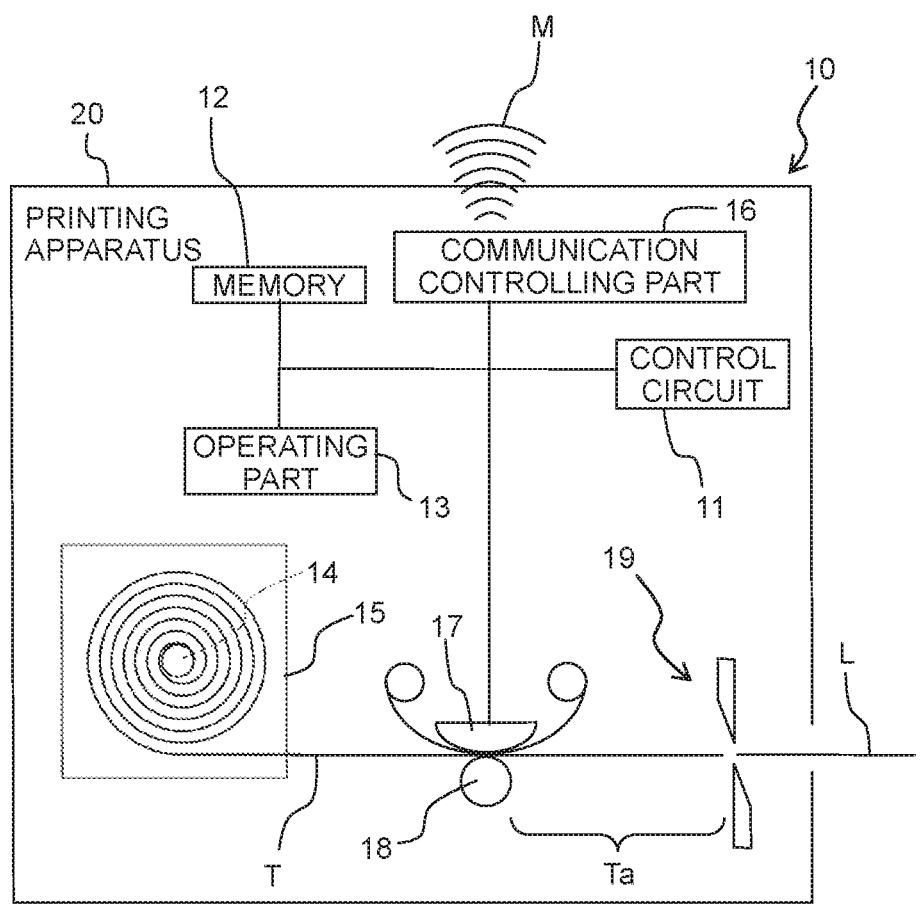
FIG. 2 is a block diagram depicting functional configuration of the printing apparatus.

As depicted in FIG. 2, the printing apparatus 10 has: a control circuit 11; a memory 12 constructed of a RAM, a ROM, etc.; an operating part 13 such as a main power source, a tape cut switch, etc.; a cartridge 15 which feeds out a print tape T having a band-like shape by rotation of a cartridge driving shaft 14 as a conveyor; a communication controlling part 16 which controls communication with the external apparatus 1 and the personal computer PC; a print head 17 as a printing unit which performs a desired printing on the print tape P as a print medium drawn or pulled out from the cartridge 15; a platen roller 18 as a conveyor which cooperates with the print head 17 so as to draw the print tape T from the cartridge 15; and a cutter unit 19 which cuts off a print label L as a printed matter from the print tape T having the printing performed thereon. Note that the control circuit 11 corresponds to a "controller" described in the claims.

The control circuit 11, the memory 12, the operating part 13 (a part, of the operating part 13, which is an electric circuit), the cartridge driving shaft 14, the cartridge 15, the communication controlling part 16, the print head 17, the platen roller 18 and the cutter unit 19 are disposed in the inside of a casing 20 of the printing apparatus 10. The casing 20 is provided with a discharge port 21 via which an end part on a discharge side of the print tape T is exposed and the print label L having the printing performed thereon and after being cut off from the print tape T is discharged.

The memory 12 stores therein, for example, a program for generating (preparing) the print label L by executing printing on the print tape T, and a program relating to the communication control, the print control, etc., with respect to the external apparatus 1, according to the present embodiment.

The communication controlling part 16 performs, in addition to the communication control by the above-described mutually recognizable wireless communication M, data transmittance/receipt in the wired or wireless communication with respect to the personal computer PC.

The print head 17 and the cutter unit 19 are separated from each other, with a spacing distance to some extent therebetween along a tape conveying direction. Therefore, there is a margin part (blank part) Ta present between the print head 17 and the cutter unit 19 on which no printing is performed. Note that a processing with respect to the margin part Ta will be described later on. Note that it is allowable to provide a function of feeding reversely or back at least a part or portion of the margin part Ta having an appropriate amount, after the print label L is cut off from the print tape T by the cutter unit 19 or before a next print processing is performed.

The control circuit 11 controls the driving of each of the cartridge driving shaft 14, the print head 17, the platen roller 18 and the cutter unit 19 based on these programs stored in the memory 12 to thereby execute the print processing.

Print data in a case of executing the print processing is received via the communication controlling part 16, and is temporarily stored in the memory 12.

On the other hand, in a case that the external apparatus 1 is a general-purpose smartphone distributed in Japan, any one of a plurality of operating systems (hereinafter simply referred to as "OS") is used therein. Representing examples of the OS used in the external apparatus 1 include iOS (trade name) as a first OS and Android (trade name) as a second OS.

Note that in the following explanation, there is such a case that the external apparatus 1 (1A to 1D) is explained while being substituted by the first OS or the second OS. Further, although the printing apparatus 10 accepts the connections by the mutually recognizable wireless communication M functioning in the variety of kinds of OS used in the personal computer PC, the following explanation will be made while being focused on the cases of the first OS and the second OS as described above.

Here, as the characteristics of the program of the mutually recognizable wireless communication M in the first OS and the second OS, different processing are performed in the first OS and the second OS regarding the respective communication states which are mutual recognition, connection, and disconnection (hereinafter referred collectively also as "paring", in some cases).

For example, the paring with the external apparatus 1 driven by the first OS has the following characteristics:

at a time of the paring, the external apparatus 1 is forcibly connected to the printing apparatus 10 from the side of the OS;

the paring is not canceled (released) and is maintained even in a case that the printing processing is completed (ended) in the printing apparatus 10;

even in a case that the printing apparatus 10 disconnects the connection, the external apparatus 1 is re-connected by an automatic re-connecting function; and in a case that the disconnection is performed from the side of the first OS, the external apparatus 1 is not re-connected to the printing apparatus 10.

Namely, the first OS can be considered as having the restriction in the paring number with respect to the printing apparatus 10.

On the other hand, the paring with the external apparatus 1 driven by the second OS has the following characteristics:

the paring is a state that only a link key (encryption key) is exchanged between the external apparatus 1 and the printing apparatus 10 (at this time, only the mutual recognition is established and any communication of print data is not performed between the external apparatus 1 and the printing apparatus 10); and the connection is made only in a case that the printing apparatus 10 receives a print executing command from the second OS, and the connection is canceled in a case that the printing is completed (intermittent connection).

Namely, the second OS can be considered as having no restriction in the paring number with respect to the printing apparatus 10.

Note that in a conventional printing apparatus, the user is made to recognize as to whether or not the printing apparatus 10 is connected to the external apparatus 1 on the one-to-one basis via the mutually recognizable wireless communication M, by, for example, switching (flashing) an LED ON and OFF, and lighting LED to be ON. For example, in the conventional printing apparatus, the LED is switched (flashed) ON and OFF in a case that there is not any connection, and the LED is lighted ON in a case that there is a connection. Also in a case that the conventional printing apparatus is configured to be connectable with respect to the plurality of pieces of the external apparatus 1, similarly to the printing apparatus 10, it is conceivable to made the user to recognize as to whether or not the conventional printing apparatus is connected to the external apparatus 1 on the one-to-one basis via the mutually recognizable wireless communication M, by, for example, switching (flashing) the LED ON and OFF, and lighting LED to be ON. In this case, in order to make the user recognize the number of the external apparatus 1 which is currently connected to the conventional printing apparatus, it is necessary to arrange the LED of which number corresponds to a number (of devices, etc.) connectable to the conventional printing apparatus (for example, 10 pieces of LED), and to separately control the switching ON and OFF, the lighting ON, etc., of the LEDs.

In such a case, however, although the user can recognize the number of the external apparatus 1 connected to the printing apparatus 10, it is not possible to recognize to which order (number) his/or external apparatus 1 corresponds among the external apparatuses 10 connected to the printing apparatus 10. As a result, it is not possible for the user to recognize whether or not there is the connection or no connection to the printing apparatus 10 (whether or not his/her external apparatus 1 is connected to or connectable to the printing apparatus 10).

Further, the external apparatus 1 has, regardless of which OS possessed thereby, has a searching function (applications) for searching a variety of kinds of apparatuses connectable in the mutually recognizable wireless communication M. In a case that this function is used, a displaying screen of the external apparatus 1 displays a list of the apparatuses equipped with the mutually recognizable wireless communication M in a communication range, indicating which one(s) of the apparatuses equipped with mutually recognizable wireless communication M is/are currently connected (already subjected to the connecting setting in the past), and which one(s) of the apparatuses equipped with mutually recognizable wireless communication M is/are connectable by the mutually recognizable wireless communication M.

Accordingly, under a condition that an apparatus equipped with the mutually recognizable wireless communication M, with which the external apparatus 1 has already completed the connection setting in the past, is present within the communication area, the external apparatus 1 is consequently paired with such an apparatus automatically.

This makes possible for the user to confirm the display of the list so as to cancel the paring of the external apparatus 1 with respect to the apparatus equipped with mutually recognizable wireless communication M and/or to newly select an apparatus equipped with the mutually recognizable wireless communication M for the paring.

On the other hand, in a case that the external apparatus 1 is the first OS and that another external apparatus 1 is already in the paring state with the printing apparatus 10, there arises such a problem that the presence of the printing apparatus 10 itself is not displayed in the search result using the searching function, of the external apparatus 1, for searching the variety of kinds of apparatuses in the mutually recognizable wireless communication M and that the paring cannot be established with respect to the printing apparatus 10.

Whereas in the case that the external apparatus 1 is the second OS, it is possible to search the printing apparatus 10. With this, although the presence of the printing apparatus 10 is displayed in the search result in the display screen of the external apparatus 1, there arises such a problem that an attempt for the paring, actually made in a state that another external apparatus 1 has been already paired with the printing apparatus 10, results in an error.

In view of this situation, the printing apparatus 10 considers the above-described problems associated with the paring via the mutually recognizable wireless communication M by the first OS and the second OS, and thus the control circuit 11 is equipped with a notifying function of notifying the user of the multiple connection (connection to a plurality of apparatuses).

Specifically, the control circuit 11 is configured to be capable of executing:

a detecting processing of detecting the number of the external apparatus 1 which is in the paring state of communicating (the first OS), or of standing by to communicate (the second OS), with the printing apparatus 10 via the communication controlling part 16 and by the mutually recognizable wireless communication M;

an image forming processing of controlling the print head 17 and the platen roller 18 (and the cartridge driving shaft 14) so as to form, on the print tape T, an image of which number corresponds to the detected number of the external apparatus 1 in the detecting processing;

a main print generating processing of controlling the print head 17 and the platen roller 18 (and the cartridge driving shaft 14) so as to generate a main print part provided with printing corresponding to print data transmitted from the external apparatus 1;

a margin generating processing of controlling the print head 17 and the platen roller 18 (and the cartridge driving shaft 14) so as to generate a margin part, along a conveying direction of the conveyance performed by the platen roller 18, which follows an upstream side in the conveying direction of the main print part;

a discharge conveying processing of discharging the image from the discharge port 21 to the outside of the casing 20, after the margin generating processing;

an OS determining processing of determining whether or not the operating system of the external apparatus 1 is the first OS having the restriction in the paring number, or the second OS not having the restriction in the paring number;

a receiving processing of receiving, via the communication controlling part 16, a paring request newly from another external apparatus 1, in addition to a plurality of pieces of the external apparatus 1 which are currently paired with the printing apparatus 10;

an upper limit determining processing of determining, in a case that the OS determining processing determines that the operating system is the first OS, whether or not the detected number of the external apparatus 1 in the detecting processing reaches a predetermined upper limit value;

a request transmitting processing of transmitting, in a case that the upper limit determining processing determines that the detected number of the external apparatus 1 reaches the predetermined upper limit value, a paring cancel request, via the communication controlling part 16, to at least one of the plurality of pieces of the external apparatus 1 paired with the printing apparatus 10; and a notification transmitting processing of transmitting a paring unavailable notification to the another external apparatus 1 from which the paring request has been received.

Next, specific processings of a print controlling routine (FIG. 3) and a pairing controlling routine (FIG. 4) executed by the control circuit 11 will be explained.

Figure 3:
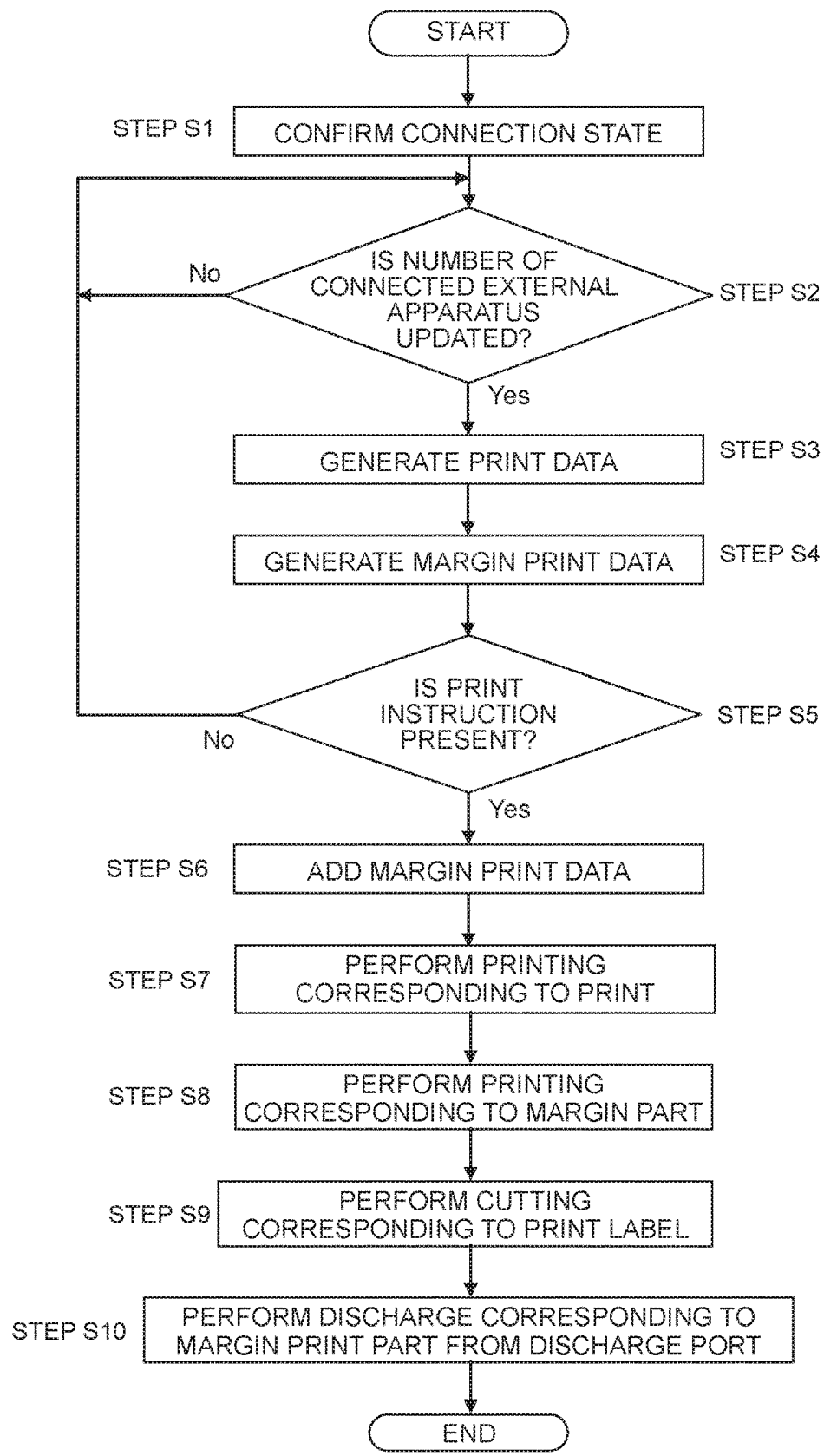
FIG. 3 is a flow chart of a print controlling routine executed by a controller of the printing apparatus.

In step S1 of FIG. 3, the control circuit 11 executes the detecting processing of detecting the number of the external apparatus 1 which is in the paring state of communicating (the first OS), or of standing by to communicate (the second OS), with the printing apparatus 10 via the communication controlling part 16 and by the mutually recognizable wireless communication M, and then the control circuit 11 proceeds the processing to step S2.

Here, the control circuit 11 stores, in the memory 12, the detected number of the external apparatus in the paring state by using, for example, the number of flag, etc.

Next, in step S2, the control circuit 11 determines whether or not the number of the external apparatus 1 connected to the printing apparatus 10 is updated. For example, the control circuit 11 determines whether or not the number of the external apparatus 1 connected to the printing apparatus 10 is updated, based on as to whether or not the number stored in the memory 12 matches a newly detected number. In a case that the control circuit 11 determines that the number of the external apparatus 1 connected to the printing apparatus 10 is updated (step S2: YES), the control circuit 11 proceeds the processing to step S3. On the other hand, in a case that the control circuit 11 does not determine that the number of the external apparatus 1 connected to the printing apparatus 10 is updated (step S2: NO), the control circuit 11 continuously monitors this processing.

Next, in step S3, the control circuit 11 generates print data based on print data from an external apparatus 1 of which paring time is the oldest (in a case of the multiple connection), and proceeds the processing to step S4. Note that the print data includes, for example, image control data such as a kind of the font, a size of the font, etc. (driver information in a narrow sense), in addition to image data such as a text, etc., for performing printing on a print label L, namely, a main print part Tb (see FIG. 1B) in the print tape T before being cut off by the cutter unit 19.

Next in step S4, the control circuit 11 generates image data to be printed on a margin part Ta which follows, along the conveying direction of the conveyance performed by the platen roller 18, the upstream side in the conveying direction of the main print part Tb, depending on the number of the external apparatus which is paired with the printing apparatus 10; and the control circuit 11 proceeds the processing to step S5.

Here, the control circuit 11 generates image data for printing, on the margin part Ta, the number of the external apparatus 1 currently connected to the printing apparatus 10 at a time of the completion (ending) of a printing in a case of preparing the print label L (for example, the external apparatuses 1B to 1D) which does not include the external apparatus 1 (for example, the external apparatus 1A) from which the print data has been transmitted at the time of preparing the print label L.

It is also allowable to make the image data, as indicated in a print result depicted in FIG. 1B (to be described later on), to correspond to the kind of the OS such that a solid star mark (black) or a hollow star mark (white) corresponds to the first OS; a solid circle (black) or a hollow circle (white) corresponds to the second OS, etc. Further, it is also allowable that whether or not the link key has been already exchanged is indicated by whether or not the solid mark or the hollow mark is printed.

Further, in consideration of the security issue, it is also allowable to perform grouping with the solid mark and the hollow mark with respect to an external apparatus 1 which is usually connected to (for example, an external apparatus 1 which has already paired with) the printing apparatus 10 and an external apparatus 1 which is not usually paired with or which has not paired yet with the printing apparatus 10 (for example, an external apparatus 1 from which the paring request is transmitted for the first time).

Furthermore, the respective marks may be allocated to the external apparatuses 1 (for example, the external apparatuses 1A to 1D), respectively, such that different marks (including triangle marks, rectangle marks, etc., other than the circles and the star marks) are allocated to the respective kinds of OS.

By doing so, each of the users is allowed to recognize, from the result of the printing on the margin part Ta, as to how many piece(s) of the external apparatus 1 are/is paired with the printing apparatus 10. Note that in such a case, as will be described later on, that the marks corresponding (allocated) to the external apparatuses 1 are indicated in the display screens of the external apparatuses 1, respectively, each of the users of the external apparatuses 1 can recognize the pairing order of himself/herself, as well.

Next, in step S5, the control circuit 11 determines whether or not a print instruction has been transmitted from an external apparatus 1 which is same as the external apparatus 1 from which the prim data has been transmitted. In a case that the control circuit 11 determines that the print instruction has been transmitted from the external apparatus 1 (from which the printing apparatus 10 has received the print instruction) (step S5: YES), the control circuit 11 proceeds the processing to step S6. On the other hand, in a case that the control circuit 11 does not determine that the print instruction has been transmitted from the external apparatus 1 (does not determine that the printing apparatus 10 has received the print instruction from the external apparatus 1) (step S5: NO), the control circuit 11 returns the processing to step S2.

Next, in step S6, the control circuit 11 is triggered by the print instruction in step S5, and the control circuit 11 adds or applies margin print data generated in step S4 to the print data generated based on the print data transmitted from the external apparatus 1 (step S3), and proceeds the processing to step S7.

Next, in step S7, the control circuit 11 generates (prints) a main print part Tb provided with printing corresponding to the print data transmitted from the external apparatus 1. For this purpose, the control circuit 11 executes the main print generating processing of controlling the print head 17 and the platen roller 18 (and the cartridge driving shaft 14) based on the print data generated in step S3 so as to perform printing of an image, and proceeds the processing to step S8.

Next, in step S8, the control circuit 11 generates, along the conveying direction, the margin part Ta which follows the upstream side in the conveying direction of the main print part Tb, based on the margin print data generated in step S4. For this purpose, the control circuit 11 executes the margin generating processing of controlling the print head 17 and the platen roller 18 (and the cartridge driving shaft 14) so as to perform printing of an image, and proceeds the processing to step S9.

Accordingly, the main print generating processing in step S7 and the margin generating processing in step S8 are an image forming processing executed by the control circuit 11 in the present embodiment.

Next, in step S9. the control circuit 11 controls the driving of the platen roller 18 (and the cartridge driving shaft 14) so as to convey the main print part Tb having the printing already performed thereon and the margin part Ta having the printing already performed thereon (or accompanying with the printing processing). Further, the control circuit 11 executes a cutting processing of driving the cutter unit 19 at an upstream side-single end part, of the main print part Tb, located at the upstream side in the conveying direction (see a two-dot chain line in FIG. 13), so as to cut a print label L off from the print tape T. Then, the control circuit 11 proceeds the processing to step S10.

Next in step S10, after the control circuit 11 has executed the printing processing on the margin part Ta in the margin generating processing in step S8, the control circuit 11 executes the discharge conveying processing of discharging the image from the discharge port to the outside of the casing so that the user can see the image as the result of printing, and the control circuit 11 ends this routine.

Note that in a case that step S10 is ended, the control circuit 11 cancels the paring depending on the kind of the OS (for example, the second OS). Accordingly, the update of the number of the external apparatus 1 connected to the printing apparatus 10 in step S2 may encompass such a determination that, in order to move down the priority in view of the completion of printing, the number of the external apparatus 1 connected to the printing apparatus 10 is reduced, in addition to such a case that an external apparatus 1 is newly added. Further in this situation, with respect to a case of an external apparatus 1 which maintains the paring with respect to the printing apparatus 10 even after the printing processing has been ended, the control circuit 11 may determine that this external apparatus 1 as a newly added external apparatus 1 as an updating processing in step S2, and may move the priority of (order of connection) regarding this external apparatus 1 to be that of the latest (newly added) apparatus.

In such a manner, the print controlling routine as indicated in FIG. 3 executes:

the detecting processing (step S1) of detecting the number of the external apparatus 1 which is in the paring state of communicating (the first OS), or of standing by to communicate (the second OS), with the printing apparatus 10 via the communication controlling part 16 and by the mutually recognizable wireless communication M, the printing apparatus 10 including: the platen roller 18 configured to convey the print tape T; the print head 17 configured to perform printing with respect to the print tape T; the communication controlling part 16 configured to perform the mutually recognizable wireless communication M; and the control circuit 11; and the image forming processing (step S7, step S8) of controlling the print head 17 and the platen roller 18 so as to form, on the print tape T, an image of which number corresponds to the number of the external apparatus 1 detected in the detecting processing.

With this, by counting the number of the image formed on the print tape T, the user can know the number of the external apparatus 1 paired with the printing apparatus 10. As a result, it is possible to improve the convenience for the user.

Further, the image forming processing includes:

the main print generating processing (step S7) of controlling the print head 17 and the platen roller 18 so as to generate the main print part Tb corresponding to print data transmitted from the external apparatus 1; and the margin generating processing (step S8) of controlling the print head 17 and the platen roller 18 so as to generate the margin part Ta, along the conveying direction, which follows the upstream side in the conveying direction of the main print part.

In the present embodiment, the image relating to the paring is formed not in the main print part Tb corresponding to the print data, but is formed in the margin part Ta following the main print part Tb. With this, it is possible to notify the user of the number of the external apparatus 1 which is in the pairing state with the printing apparatus 10, without spoiling the aesthetic appearance of the main print part Tb.

Furthermore, after the control circuit 11 executes the printing processing in the margin part Ta in the margin generating processing, the control circuit 11 executes the discharge conveying processing (step S10) of discharging the image from the discharge port 21 to the outside of the casing 20 so that the user can see the image as the result of printing. With this, the user is allowed to visually confirm the margin part Ta in an ensured manner and to recognize the number of the external apparatus 1 paired with the printing apparatus 10 (and the kind of OS and the priority in connection).

On the other hand, the control circuit 11 executes a paring controlling routine so as to, for example, execute the determination regarding the update in the number of the external apparatus 1 connected to the printing apparatus 10 indicated in step S2, and as an interrupting processing during each of the respective routines as indicated in FIG. 3.

At first, in step S11, the control circuit 11 determines whether or not there is any paring request from the external apparatus 1. In a case that there is a paring request from the external apparatus 1 (step S11: YES), the control circuit 11 proceeds the processing to step S12. On the other hand, in a case that the control circuit 11 does not determine that there is a paring request (step S11: NO), the control circuit 11 monitors this routine continuously.

Next, in step S12, the control circuit 11 executes OS determining processing of determining whether or not the operating system of the external apparatus 1 is the first OS having the restriction in the paring number, or the second OS not having the restriction in the paring number. Here, the control circuit 11 handles the processing on the premise that the OS of the external apparatus 1 is only any one of the first OS and the second OS. The control circuit 11 determines whether or not the OS is the first OS; in a case that the control circuit 11 determines that the OS is the first OS (step S12: YES), the control circuit 11 proceeds the processing to step S13. On the other hand, in a case that the control circuit 11 does not determine that the OS is the first OS (step S12: NO), the control circuit 11 proceeds the processing to step S16.

Next, in step S13, in a case that the control circuit 11 determines, in the OS determining processing in step S12, that the operating system of the external apparatus 1 from which the paring request has been received is the first OS, the control circuit 11 executes the upper limit determining processing of determining whether or not the detected number of the external apparatus 1 in the detecting processing in step S1 reaches the predetermined upper limit value. In a case that the control circuit 11 determines that the detected number of the external apparatus 1 in the detecting processing in step S1 reaches the predetermined upper limit value (step S13: YES), the control circuit 11 proceeds the processing to step S14. On the other hand, in a case that the control circuit 11 does not determine that the detected number of the external apparatus 1 reaches the predetermined upper limit value (step S13: NO), the control circuit 11 proceeds the processing to step S16.

Next, in step S14, the control circuit 11 executes the notification transmitting processing of transmitting, via the communication controlling part 16, the paring unavailable notification to the external apparatus 1 from which the paring request has been received, and the control circuit 11 proceeds the processing to step S15.

With this, the user operating the external apparatus 1 which has newly performed the paring request can recognize that the paring is not established.

Next, in step S15, in a case that the control circuit 11 determines, in the upper limit determining processing in step S13, that the number of the external apparatus reaches the predetermined upper limit value, the control circuit 11 executes the request transmitting processing of transmitting, via the communication controlling part 16, the paring cancel request to at least one of the plurality of pieces of the external apparatus 1 paired with the printing apparatus 10; and the control circuit 11 ends the routine in restriction of the number of the connected external apparatus regarding the first OS.

With this, the user operating the external apparatus 1 which receives the paring cancel request can recognize that there are the external apparatuses 1 crowding to connect to the printing apparatus 10. Accordingly, if the external apparatus 1 operated by the user is merely in a state of paring connection such as not having any data to be printed, the user is capable of performing an operation to cancel the paring so as to let another user to use the printing apparatus 10.

Note that the notification transmitting processing of transmitting the paring unavailable notification in step S14 and the request transmitting processing of transmitting the paring cancel request in step S15 are notifications (communications of information) to different external apparatuses 1, respectively. Either one of the notification transmitting processing of transmitting the paring unavailable notification in step S14 and the request transmitting processing of transmitting the paring cancel request in step S15 may be performed firstly. Alternatively, the notification transmitting processing of transmitting the paring unavailable notification in step S14 and the request transmitting processing of transmitting the paring cancel request in step S15 may be executed in parallel to each other at a time.

On the other hand, in step S16, the control circuit 11 executes the receiving processing of receiving, via the communication controlling part 16, the paring request newly from another external apparatus 1, in addition to a plurality of pieces of the external apparatus 1 which are paired with the printing apparatus 10; and the control circuit 11 ends the paring controlling routine in a case that the OS is the second OS and in a case that although the OS is the first OS, the number of the connected external apparatus 1 has not reached the upper limit value.

As described above, in the present embodiment, the control circuit 11 executes the OS determining processing of determining whether or not the operating system of the external apparatus 1 is the first OS having the restriction in the paring number, or the second OS not having the restriction in the paring number, thereby making it possible to perform processing and/or control finely adjusted depending on the kind of the OS.

Further, the control circuit 11 executes:

the receiving processing of receiving, via the communication controlling part 16, the paring request newly from another external apparatus 1, in addition to a plurality of pieces of the external apparatus 1 which are paired with the printing apparatus 10;

the upper limit determining processing of determining, in a case that the OS determining processing determines that the operating system is the first OS, whether or not the detected number of the external apparatus 1 in the detecting processing reaches the predetermined upper limit value; and the request transmitting processing of transmitting, in a case that the upper limit determining processing determines that the number of the external apparatus reaches the predetermined upper limit value, the paring cancel request to at least one of the plurality of pieces of the external apparatus 1 via the communication controlling part 16.

In the present embodiment, regarding the OS wherein an external apparatus 1 cannot be newly paired with the printing apparatus 10 in a case that the number of the external apparatus 1 paired with the printing apparatus 10 reaches the upper limit value, any one of the external apparatus(es) which is already paired is requested to cancel the paring. This makes it possible for a new external apparatus 1 to be paired with the printing apparatus 10.

Further, the control circuit 11 executes the notification transmitting processing of transmitting, via the communication controlling part 16, the paring unavailable notification to the an external apparatus 1 from which the paring request has been received. By doing so, in a case that the number of the external apparatus 1 paired with the printing apparatus 10 reaches the upper limit value, it is possible to notify the user that any paring with the new external apparatus 1 is not possible or available until the paring with respect to any one of the external apparatustes) 1 is canceled.

Note that in the printing apparatus 10 of the present embodiment, in a case that the operating system of an external apparatus 1 is the first OS, the paring state encompasses a state that the link key is exchanged between the printing apparatus 10 and the external apparatus 1 and that the external apparatus 1 and the printing apparatus 10 are connected to each other in a data-transmissible and receivable manner.

On the other hand, in the printing apparatus 10 of the present embodiment, in a case that the operating system of an external apparatus 1 is the second OS, the paring state encompasses a state that the link key is exchanged between the printing apparatus 10 and the external apparatus 1; and in a case that a print instruction is issued by the external apparatus 1, the external apparatus 1 and the printing apparatus 10 are connected to each other in the data-transmissible and receivable manner, and in a case that printing corresponding to the print instruction is finished, the connection between the external apparatus 1 and the printing apparatus 10 in the data-transmissible and receivable manner is cancelled.

Furthermore, in the foregoing description, the present embodiment has been explained as being configured to print, in the margin part Ta, an image which allows the user to recognize the paring state: it is also possible, however, to transmit a display of which appearance is same as being printed on the margin part Ta to each of the external apparatuses 1 and to cause the display to be displayed on a display screen of each of the external apparatuses 1.

In such a case, the display screen of each of the external apparatuses 1 may be configured to provide an aspect of display wherein which mark is allocated to each of the external apparatuses 1 itself can be recognized and wherein the order allocated to each of the external apparatuses 1 is in which position can be recognized.

Note that the above-described aspect of displaying may be realized, for example, by switching ON and OFF of a mark included in a plurality of marks which are same as those in the margin part Tb and corresponding to each of the external apparatuses 1, other than the above-described displaying of the star marks, circles, etc., so that the user can recognize which mark is allocated to his/her own external apparatus 1.

Further, the flow charts as depicted in FIGS. 3 and 4, respectively, are not intended to limit or restrict the processings described in the present disclosure by the orders of the routines as described above, respectively. It is allowable to add, delete or change the orders of the routine for each of the processings, within the gist or spirit and the technical idea of the present disclosure.

Furthermore, other than those described above, it is allowable to appropriately combine and use the methods of the embodiment and the respective modifications.

Other than those described above, the present disclosure is realized while a variety of kinds of changes are added thereto within the range of the gist or spirit of the present disclosure.

What is claimed is:

1. A printing apparatus comprising:
   a conveyor configured to convey a print medium;
   a printing unit configured to perform printing onto the print medium;
   a communication unit configured to perform mutually recognizable wireless communication; and
   a controller configured to execute:
     detecting of the number of an external apparatus which is in a paring state of communicating, or of standing by to communicate, with the printing apparatus via the communication unit and by the mutually recognizable wireless communication;
     determining a kind of an operating system of the external apparatus; and
     controlling of the conveyor and the printing unit so as to print, onto the print medium, an image which corresponds to the kind of the operating system and the number of which corresponds to the detected number of the external apparatus.

2. The printing apparatus according to claim 1, wherein the controller is configured to further execute:
   controlling of the conveyor and the printing unit so as to print a main print part corresponding to print data transmitted from the external apparatus, and
   controlling of the conveyor and the printing unit so as to generate a margin part, in a conveying direction of the conveyor, which follows an upstream side in the conveying direction of the main print part; and
   in a case that the controller generates the margin part, the controller is configured to execute printing of the image, of which number corresponds to the detected number of the external apparatus, on the print medium.

3. The printing apparatus according to claim 2, further comprising:
   a casing configured to cover the conveyor and the printing unit; and
   a discharge port via which the print medium is discharged to outside of the casing,
   wherein the controller is configured to further execute, after generating the margin part, discharging of the print medium having the image printed thereon from the discharge port to the outside of the casing.

4. The printing apparatus according to claim 1, wherein the controller is configured to further execute:
   controlling of the conveyor and the printing unit so as to print a main print part corresponding to print data transmitted from the external apparatus, and
   controlling of the conveyor and the printing unit so as to generate a margin part, in a conveying direction of the conveyor, which follows an upstream side in the conveying direction of the main print part; and
   in a case that the main print part is printed, the controller is configured to execute printing of the image, of which number corresponds to the detected number of the external apparatus, on the print medium.

5. The printing apparatus according to claim 1, wherein the controller is configured to further execute:
   determining of whether the operating system of the external apparatus is a first OS having a restriction in a paring number, or a second OS not having the restriction in the paring number.

6. The printing apparatus according to claim 5, wherein the controller is configured to further execute:
   receiving of, via the communication unit, a paring request newly from another external apparatus, in addition to a plurality of pieces of the external apparatus which are in the paring state with the printing apparatus;
   in a case that the operating system of the external apparatus is determined to be the first OS, determining of whether or not the detected number of the external apparatus reaches a predetermined upper limit value; and
   in a case that the detected number of the external apparatus reaches the predetermined upper limit value, transmitting of, via the communication unit, a paring cancel request to at least one of the plurality of pieces of the external apparatus in the paring state.

7. The printing apparatus according to claim 6, wherein the controller is configured to further execute:
   transmitting of, via the communication unit, a paring unavailable notification to the another external apparatus from which the paring request has been received.

8. The printing apparatus according to claim 5, wherein the paring state, in a case that the operating system of the external apparatus is the first OS, is a state that a link key is exchanged between the printing apparatus and the external apparatus and that the external apparatus and the printing apparatus are connected to each other in a data-transmissible and receivable manner.

9. The printing apparatus according to claim 5, wherein the paring state, in a case that the operating system of the external apparatus is the second OS, is a state that a link key is exchanged between the printing apparatus and the external apparatus; and in a case that a print instruction is issued by the external apparatus, the external apparatus and the printing apparatus are connected to each other in a data-transmissible and receivable manner, and in a case that printing corresponding to the print instruction is finished, the connection between the external apparatus and the printing apparatus in the data-transmissible and receivable manner is cancelled.

\* \* \* \* \*